June 16, 1942.  O. W. RICHARDS  2,286,977
CAMERA
Filed Feb. 21, 1940  2 Sheets-Sheet 1

INVENTOR
OSCAR W. RICHARDS
BY
Raymond A. Paquin
ATTORNEY

June 16, 1942. O. W. RICHARDS 2,286,977
CAMERA
Filed Feb. 21, 1940 2 Sheets-Sheet 2
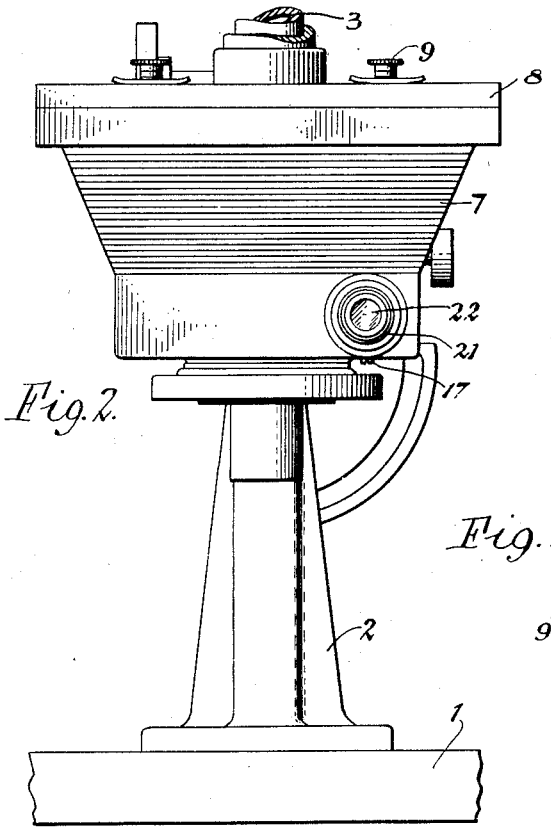
Fig.2.
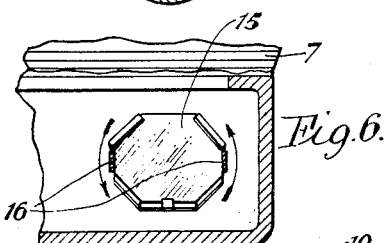
Fig.5.
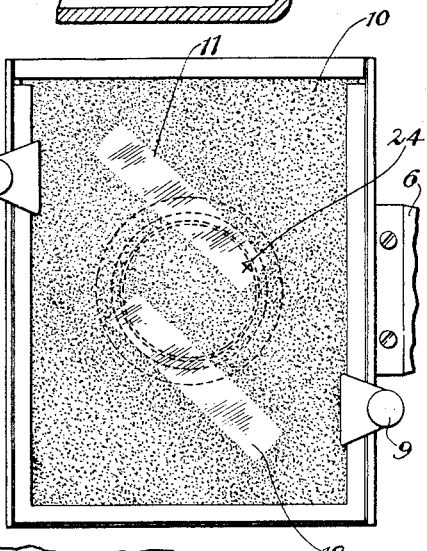
Fig.6. Fig.7.
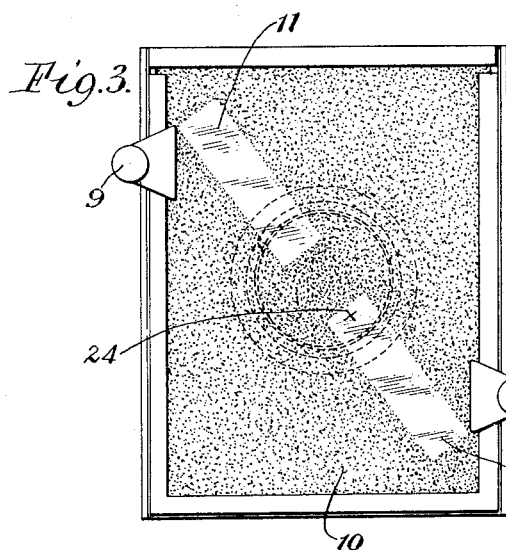
Fig.3.
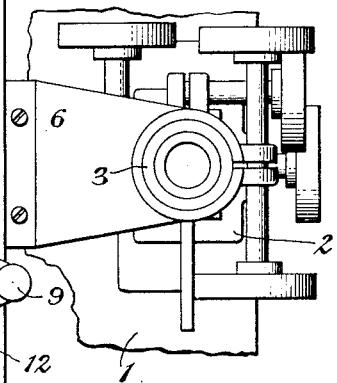
INVENTOR
OSCAR W. RICHARDS
BY Raymond A. Paquin
ATTORNEY Patented June 16, 1942

2,286,977

UNITED STATES PATENT OFFICE 2,286,977

CAMERA

Oscar W. Richards, Snyder, N. Y., assignor to Spencer Lens Company, Buffalo, N. Y., a corporation of New York Application February 21, 1940, Serial No. 329,139

8 Claims. (Cl. 95—42)

This invention relates to cameras and more particularly to new and improved means for focusing the same.

One of the objects of the invention is to provide a new and improved means for a camera whereby it may be quickly, easily and accurately focused.

Another object is to provide new and improved focusing means for a camera where focusing on fine detail is required.

Another object is to provide new and improved adjustable focusing means for a camera.

Another object is to provide new and improved adjustable focusing means for a camera which may be adjusted to compensate for the accommodation of the viewer's eye and which does not require the use of parallax movement to insure that the image is focused in the plane of a cross hair.

Another object is to provide camera focusing means wherein the entrance of light through the focusing means while the picture is being taken is prevented.

Another object is to provide new and improved means for focusing on fine detail with photomicrographic and photomacrographic cameras.

Other objects of the invention will be apparent from the following description taken in connection with the accompanying drawings and it will be understood that many changes in the details of construction and arrangements of parts may be made without departing from the scope of the invention as expressed in the accompanying claims. I, therefore, do not wish to be limited to the construction shown and described as that is done by way of illustration only.

Referring to the drawings:

Fig. 2 is a front view of Fig. 1;

Fig. 3 is a plan view of the camera shown in Figs. 1 and 2;

Fig. 5 is a sectional view taken on line 5—5 of Fig. 4;

Fig. 6 is a sectional view taken on line 6—6 of Fig. 4; and

Fig. 7 is a partial view similar to Fig. 3 and showing a modified form of ground glass screen.

Figure 1:
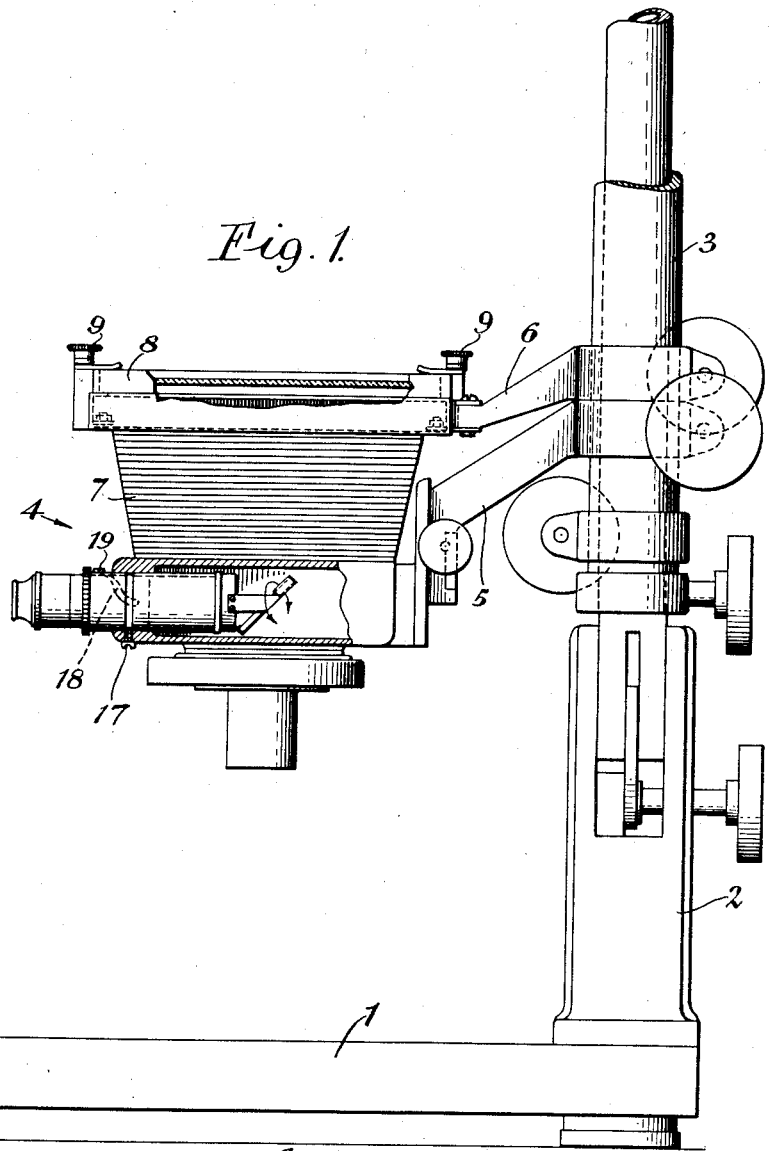
Fig. 1 is a side view of a camera embodying my invention.
Figure 4:
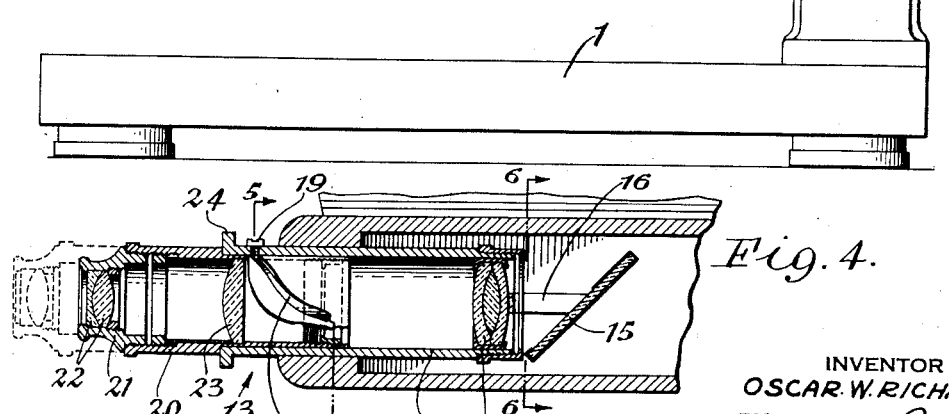
Fig. 4 is an enlarged sectional view of the focusing means shown in Fig. 1.

In the past there has been considerable difficulty in focusing copying cameras and photomicrographic and photomacrographic cameras.

When a ground glass screen was used, the screens often had clear central areas for focusing with the aid of a magnifying glass. Frequently, however, when the center was focused clearly, the edges were not; that is, with such an arrangement it was impossible to know when the rest of the plate to the corners was focused critically on the fine detail. It was further difficult to center the image as the image could not be seen in the clear central region with the naked eye.

When it is desirable to use a ground glass screen, I have provided such a screen which allows the operator to ascertain when the image is centered on the plate with the unaided eye and is focused in fine detail in the corners as well as at the center so that the complete picture is focused in as fine detail as possible.

A ground glass, or other translucent coating or material used in the manufacture of camera focusing screens, has appreciable depth. The coarser the grinding of the glass or the thicker the translucent layer, the greater is the depth and the more difficult it becomes for the photographer to judge when the best focus is attained. This uncertainty, inevitable in such screens, becomes a serious problem when very fine detail must be recorded in photomicrographs at great magnifications.

The problem due to depth in a focusing screen may be avoided by the use of a plane surface (instead of the former translucent screen) which has no perceptible depth. Such a surface must have good reflecting power or may be obtained with a medium-gloss white enamel or other similarly reflecting material and be supported on an opaque material and so that it will be in the same position as the emulsion of the plate or film used in the camera.

To overcome this drawback in prior art constructions, I have provided an adjustable focusing telescope arrangement which allows a view of the image of the object on a plane screen and makes it possible to ascertain when the complete image is focused in fine detail.

Referring more particularly to the drawings wherein similar reference characters designate corresponding parts throughout the several views, and wherein the invention is shown applied to a photomicrographic camera for the purpose of illustration only, although its use is not limited to this particular type of camera, the device comprises a base 1 to which is secured an upright clamping member 2, and an upright supporting bar 3 is supported by said clamping member 2. The pivotal connection between the members 2 and 3 is such that the member 3 may be retained at any angle desired with relation to the base 1 and thereby enabling the camera to be used to take stereoscopic pictures through the angled eyepiece of instruments such as the binocular-biobjective type microscope; as well as at any angle from horizontal to somewhat beyond the vertical.

The camera 4 is supported on the upright 3 by means of the brackets 5 and 6 which are slidable on the member 3. By raising or lowering the bracket 5, the camera may be raised or lowered to desired height from the base 1 such as may be required by the object which is photographed or the instrument used with the camera. The bracket 6 may be raised or lowered to open the bellows 7 of the camera 4 the amount required.

Sometimes it may be desirable to focus the image on a ground glass screen 8 which screen is placed on the upper end of the camera and retained thereon by spring pressed clips 9. When such a screen is employed the focusing telescope hereinafter described, if present, is turned so as to prevent light from entering therethrough into the interior of the camera as also hereinafter described.

I have found that by using the type of ground glass screen shown in Figs. 3 and 7, that it is possible to center the image exactly with the unaided eye, because my construction retains the ground surface at the center of the screen. This advantage is lost when the center is made clear by cementing a cover glass in the center as is now common in this art.

The clear region at the center is used with a magnifying glass focused on a fiducial mark for greater ease of focusing the camera, and in prior art the advantage is restricted to the central region. My improvement consists in placing one or more clear strips 11, 12 so that they extend from close to the center to near the corners of the screen. One of these contains the usual reference mark 24 at the surface of the screen. With these clear spaces, it is possible to use a magnifying glass and to obtain the best focus from sufficiently near the center to the corners and in between these extremes. The exact size and placement of the clear regions may be adjusted to the requirements of the instrument provided that they meet my improvement of retaining enough of the central region translucent for centering and extending as far into the camera as necessary. With improved modern lenses it is desirable and essential that the corners be focused as well as the center.

For very precise focus the ground glass screen is replaced by an opaque white plate. The ground glass is too rough for critical focusing because of the depth depending on the fineness and, it is therefore hard to decide on the proper focus, whereas the white screen surface has no depth and allows focusing to full sharpness limited only by the precision of the optics used.

The focusing telescope 13 which is secured in one side of the lower part of the camera body comprises a tubular member 14 which is pivotal in the camera body and to which is fixed the mirror or reflector 15 by brackets such as 16. As shown in Fig. 1 the tube 14 is secured to the camera body by the screw 17 although any other suitable means may be used.

The said tubular member 14 also contains the spiral groove 18 in which is adapted to slide the set screw 19 in the tubular member 20 which has an eyepiece 21 containing lenses 22 and 23 and an objective lens system including the objective lens arrangement 25. The eyepiece 21 is shown threaded into the interior of the tubular member 20.

The said spiral groove 18 and screw 19 cooperate so that by turning the tube 20 the distance between the objective lens tube 20 and object lens system will be adjusted to required focus so the image on the white screen can be seen in the reflector 15 and by pivoting the tube 14 by turning the projecting flange 24 the whole image on the white screen can be scanned thereby enabling the operator to know when the image is focused in fine detail on said white screen.

It will be apparent that when the camera is used with the bellows nearly closed the scanning will be more important. When the bellows is extended the entire field may be seen at the same time without the necessity of scanning.

When the picture is being taken the mirror 15 is turned so as to face the adjacent wall of the camera body and thereby act as a light trap and prevent light from entering the interior of the camera through the focusing telescope 13 and any fogging of the film or plate from this source while the photograph is exposed.

To facilitate this and also to indicate when the reflector is turned to the light trap, the screw 19 serves as an index. This same screw 19 is useful as an indicator when turning the telescope by means of flange 24 so that mirror 15 faces the focusing screen.

Rotating the eyepiece which is possible because of spiral groove 18 permits the observer to focus the telescope onto the focusing screen. It is desirable to place a reference mark at the center of the surface of the focusing screen. This will assist in the focusing of the telescope and in the centering of the image.

It will be apparent that by adjusting the eyepiece portion of the focusing telescope; that is, moving it back and forth it can be adjusted to give a clear picture of the image on the screen throughout the extension range of the bellows. As it is readily perceived when the telescope is in focus, no cross hairs, such as are necessary in prior art telescopes, are required in the eyepiece for locating the image. My improvement in the art facilitates and speeds up the process of focusing as well as increasing its precision.

Also, it will be noted that by employing the focusing telescope and white surfaced opaque screen that all question of judgment as is involved in the use of ground glass focusing screens will be eliminated as the focus must be on a surface free from depth.

It will be apparent from the above that I have provided simple, efficient and economical means for obtaining all of the objects and advantages of the invention and also overcoming the defects of prior art constructions as set forth above.

Having described my invention, I claim:

1. In a device of the character described, a camera, a screen in said camera on which an image of an object to be photographed may be focussed, a telescopic device extending into said camera, for observing the image on said screen, said telescopic device comprising a pair of telescoping tubes, one of said tubes having an eyepiece and the other of said tubes having an objective lens system, said tubes being adjustable relative to each other to focus the lens system, and a reflector secured to the inner end of the tube having the objective and in alignment therewith and adapted to reflect an image of the image on the screen through said objective and eyepiece.

2. In a device of the character described, a camera, a screen in said camera on which an image of an object to be photographed may be focussed, a telescopic device extending into said camera for observing the image on said screen, said device comprising a pair of telescoping tubes, one of said tubes having an eyepiece and the other of said tubes having an objective lens system, the tube containing the eyepiece being adjustable relative to the other tube to focus the lens system, and a reflector secured to the inner end of the tube having the objective and in alignment therewith and adapted to reflect an image of the image on the screen through said objective and eyepiece.

3. In a device of the character described, a camera, a screen in said camera on which an image of an object to be photographed may be focussed, a telescopic device extending into the camera for observing the image on said screen, said device comprising a pair of telescoping tubes, one of said tubes having an eyepiece and the other of said tubes having an objective lens system, said tubes being adjustable relative to each other, and a reflector secured to said tube having the objective and adapted to reflect an image of the image on the screen through said objective and eyepiece, and one of said tubes being pivotable to pivot said reflector out of alignment with said screen to prevent light from entering the camera through said telescopic device.

4. In a device of the character described, a camera, a screen in said camera on which an image of an object to be photographed may be focussed, a telescopic device extending into the camera for observing the image on said screen, said device comprising a pair of telescoping tubes, one of said tubes having an eyepiece and the other of said tubes having an objective lens system, said tubes being adjustable relative to each other, and a reflector in the camera and secured to the inner end of the tube having the objective and in alignment therewith and adapted to reflect an image of the image on the screen through said objective and eyepiece, and one of said tubes being pivotable to pivot said reflector out of alignment with said screen to prevent light from entering the camera through the telescopic device.

5. In a device of the character described, a camera, a screen in said camera on which an image of an object to be photographed may be focussed, a telescopic device extending into the camera for observing the image on said screen, said device comprising a pair of telescoping tubes, one of said tubes having an eyepiece and the other of said tubes having an objective lens system, a groove in one of said tubes, a pin in the other of said tubes and adapted to slide in a groove in the first tube whereby on turning one of said tubes the relative position of the tubes and the eyepiece and objectives will be changed, and a reflector in said camera and secured in alignment with the inner end of the tube having the objective and adapted to reflect an image of the image on the screen through said objective and eyepiece where it may be viewed by an observer.

6. In a device of the character described, a camera, a screen in said camera on which an image of an object to be photographed may be focussed, a telescopic device extending into said camera for observing the image on said screen, said telescopic device having an eyepiece and an objective lens system, said eyepiece and objective lens system being adjustable relative to each other to focus the lens system, and a reflector secured adjacent the inner end of said telescopic device and in alignment therewith and adapted to reflect an image of the image on the screen through said objective and eyepiece, said reflector being adjustable to scan the image field of said screen.

7. In a device of the character described, a camera, a screen in said camera on which an image to be photographed may be focussed, a telescopic device extending into said camera for observing the image on said screen, said device comprising a pair of telescopic tubes, one of said tubes having an eyepiece and the other of said tubes having an objective lens system, the tube containing the eyepiece being adjustable relative to the other tube to focus the lens system, and a reflector secured to the inner end of the tube having the objective and in alignment therewith and adapted to reflect an image of the image on the screen through said objective and eyepiece, said reflector being adjustable to scan the image field of said screen.

8. In a device of the character described, a camera, a screen in said camera on which an image of an object to be photographed may be focussed, a telescopic device extending into the camera for observing the image on said screen, said device comprising a pair of telescoping tubes, one of said tubes having an eyepiece and the other of said tubes having an objective lens system, a groove in one of said tubes, a pin in the other of said tubes and adapted to slide in the groove in the first tube whereby on turning one of said tubes the relative position of the tubes and the eyepiece and objective will be changed, and a reflector in said camera and secured in alignment with the inner end of the tube having the objective and adapted to reflect an image of the image on the screen through said objective and eyepiece where it may be viewed by an observer, said reflector being adjustable to scan the image field of said screen.

OSCAR W. RICHARDS.